Aug. 16, 1966    J. YUTKOWITZ    3,266,270
PRECISION COUPLING AND ADJUSTABLE ZEROING DEVICE
Filed Aug. 5, 1964    3 Sheets-Sheet 2

INVENTOR.
JEROME YUTKOWITZ
BY Max A. Farmer
Ernest J. Wemberger
ATTORNEYS

# United States Patent Office 3,266,270
Patented August 16, 1966

3,266,270
PRECISION COUPLING AND ADJUSTABLE
ZEROING DEVICE
Jerome Yutkowitz, Brooklyn, N.Y., assignor to the United
States of America as represented by the Secretary of the
Navy
Filed Aug. 5, 1964, Ser. No. 387,814
1 Claim. (Cl. 64—24)

The invention described herein may be manufactured and used by or for the Government of the United States of America for government purposes without the payment of any royalties thereon or therefor.

This invention relates to flexible couplings of the type employed to dynamically connect together a pair of shafts which may be misaligned while transmitting therethrough precise angular shaft displacement. A more particular relation concerns herein a coupling arrangement wherein the shafts may be precisely positioned angularly with respect one to the other.

Present and previous flexible coupling arrangements which are also capable of precise shaft zeroing require rather cumbersome optical methods and instrumentation including the use of mirrors to ascertain the turned or the relative angular displacement. On the other hand existing types of couplings are either too weak in the torsional mode or so stiff that errors caused by high side thrusts were introduced when the coupled shafts were slightly misaligned. With these systems the angular zeroing between a pair of slightly misaligned shafts exceeds one second of arc.

In view of the foregoing it is an object of this invention to provide a simple, inexpensive, direct flexible coupling capable of accurately transmitting angular rotation between a pair of misaligned shafts.

Another object is to provide a flexible coupling arrangement between misaligned shafts which includes the ability of accurately zeroing or displacing one shaft relative to the other.

Other objects and advantages will appear from the following description of an example of the invention and the novel features will be particularly pointed out in the appended claim.

Figure 1:
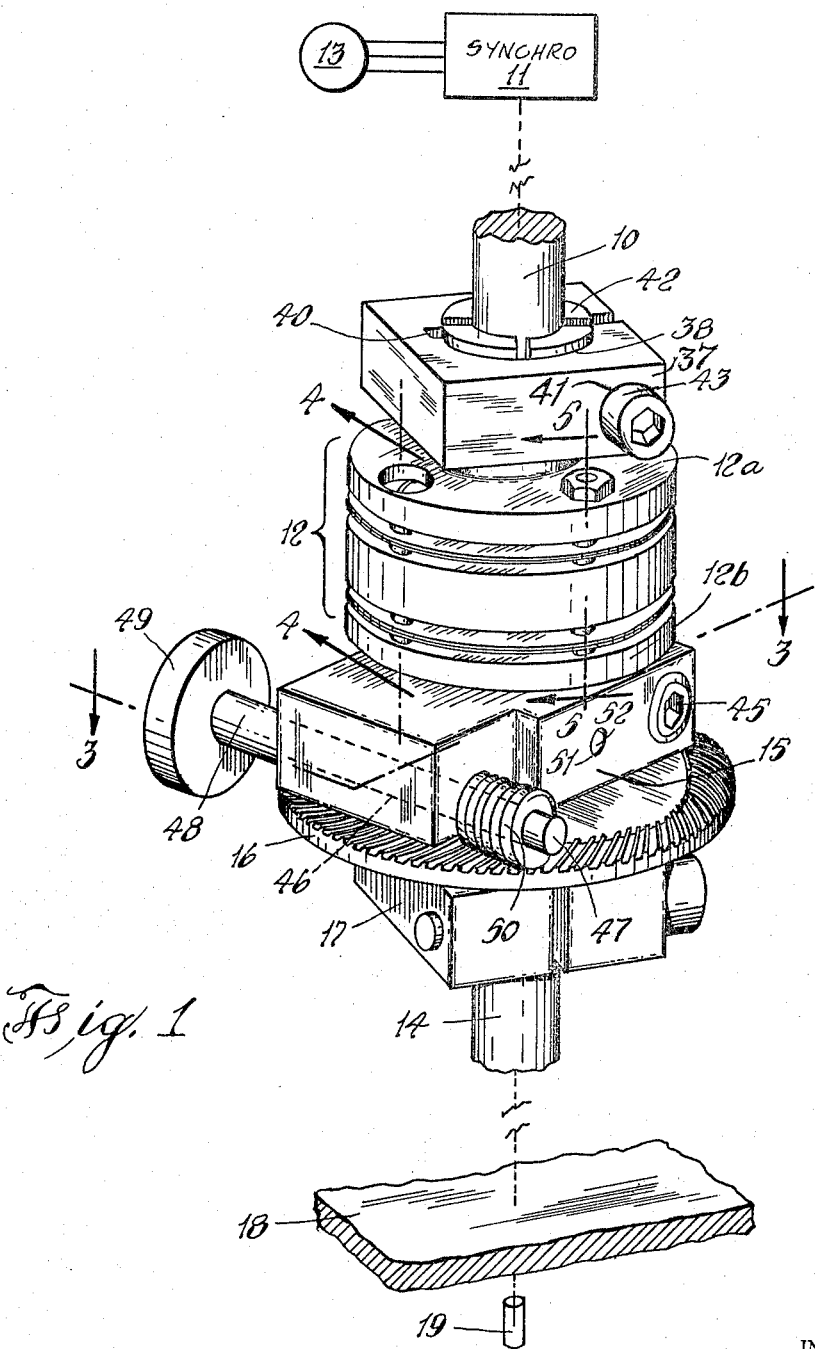
FIG. 1 is a perspective view of an embodiment made in accordance with the principles of this invention.

In the illustrated embodiment of this invention shown in FIG. 1 a shaft 10 connects a synchro 11 to one end 12a of the flexible coupling arrangement 12. The electrical output of the synchro 11 is fed into meter or indicator 13 which is capable of indicating a balance or zero position of the synchro. The opposite end 12b of the coupling 12 is connected to shaft 14 on which is carried an adjusting clamp 15, an indexing table 16 and a hub clamp 17 and may terminate at some reference table device 18 as for example, a calibrated indexed readout which may be independently set to read a particular direction as by indicator 19.

Figure 2:
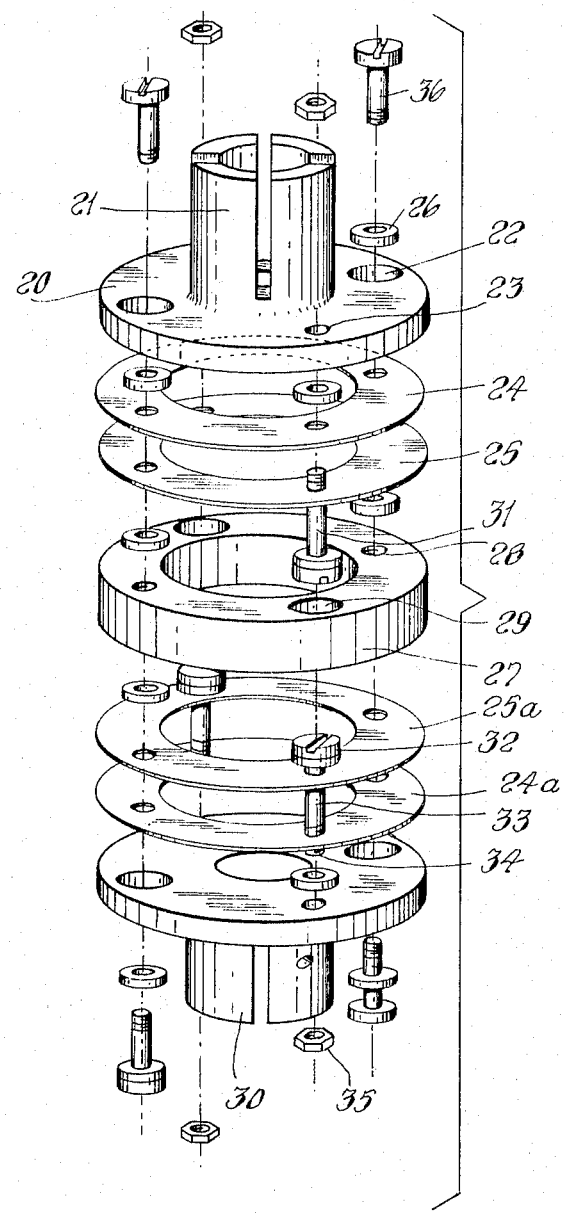
FIG. 2 is an exploded view in perspective of the flexible coupling of FIG. 1; and, FIG. 3 is a cross section approximately along line 3—3 of FIG. 1 with a part thereof broken away.

FIG. 2 illustrates the flexible couping assembly 12 in which one circular end plate 20 is provided on one face with a split type hub 21 extending outwardly of the plate. Two pairs of diametrically opposed openings extend axially through the plate from face to face. Two of these openings 22 are somewhat larger than the other openings 23. Face to face but spaced therefrom are a pair of flexible discs 24 and 25 which when assembled tightly abut one another. These discs are provided with openings aligned with the openings in the end plate 20 and are of some flexible metallic spring material such as beryllium copper. Interposed between these discs and the end plate 20 are ring washers 26. Centrally disposed within the coupling assembly is center plate 27 which likewise is provided with passages therethrough. Two of the passages 28 are threaded internally while the other two larger passages 29 are aligned with the smaller openings 23 in the end plate 20. Ring washers 26 are also disposed between the discs (24, 25) and the center plate 27 so that the discs are separated from the plates by the ring washers.

Disposed on the opposite side of the center plate 27 are discs 24a and 25a, end plate 30 and washers 26a all identical to their counterparts already described and in the same relative positions. Within the passages 29 of the center plate are bolts 31 whose heads 32 are just smaller in diameter than the passages and are arranged in each passage with their heads opposite one another and their shank portions 33 extending outwardly thereof. The shank portion is of a diameter just sufficient to pass through the openings in the discs and flexibly support them thereon. The threaded end portion 34 extends through and beyond the openings 23 of the end plates and nut 35 secures the bolt therein. Since the bolt heads 32 are free to move in and along the passage 29 while the opposite ends thereof are fixed one degree of freedom is provided for the coupling. Another degree of freedom is attained by threading bolts 36 into the openings 28 of center plate 27 while their heads 37 are free to move along openings 22 of the end plates. The shafts to be coupled by this coupling are inserted through hubs 21 of the end plates but extend therein just short of the discs. Hub clamps where necessary secure the shafts to the hubs as shown in FIG. 1. Here clamp 37 is essentially a solid block having a central opening just slightly larger than the hub diameter of the coupling assembly in order to permit its placement thereover. The block or clamp is provided with a radially extending slot 39 starting at an edge and which terminates just past the central opening at 40. The block clamp is provided with a bore 41 extending crosswise of the slot from opposite edges of the clamp without passing through the central opening 38. By threading one end 42 of this bore 41 a bolt 43 is employed to tighten the clamp peripherally about the hub and thereby fixedly secure the shaft to the hub and the plate. This fastening arrangement is more clearly illustrated by way of FIGS. 1 and 3 and does not require further explanation.

As shown in FIG. 1 this clamp 37 secures shaft 10 to the flexible coupling 12 while adjusting clamp 15 accomplishes a similar function for shaft 14. Clamp 15 additionally is provided with an extension 44 opposite the bolt 45 having a passage 46 therethrough parallel to the bolt 45. Disposed within this passage is a shaft 47 which at one end 48 is enlarged to prevent movement in one direction through the passage 46. The end 48 of the shaft terminates in an adjustment knurled knob 49 while the other end is encircled and supports a spiral gear 50 which rotates therewith. Extending from one face through the clamp 15 is another opening 51 into which is inserted a locking pin 52. The pin 52 passes through the clamp and into but not necessarily through the hub of the coupling 12 to thereby prevent relative rotation between the clamp when it is loosened and the coupling 12. They will therefore always rotate with one another as long as the pin is in place.

Figure 3:
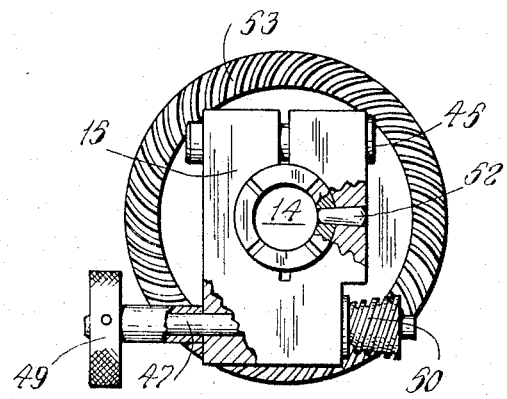
Figure 4:
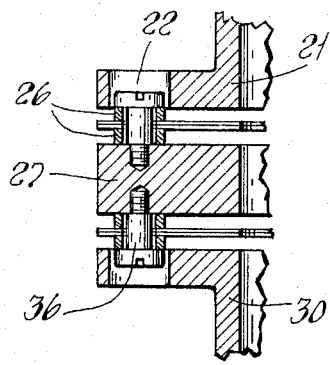
FIG. 4 is a cross section approximately along line 4—4 of FIG. 1.
Figure 5:
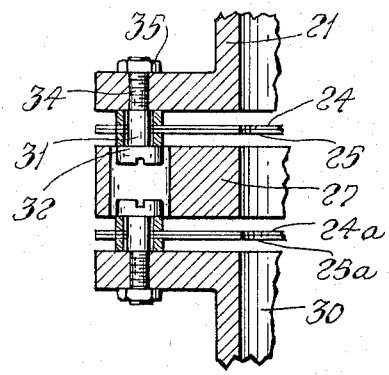
FIG. 5 is a cross section approximately along line 5—5 of FIG. 1.

The indexing table 16 which is also shown in FIG. 3 is a circular plate having along its upper surface a peripheral gear 53 which may be a separate component affixed thereto or as illustrated, an integral part thereof. The gear arrangement is made to mesh with the pinion 50 of clamp 15 so that the two coact and cause rotation of one relative to the other. This gear and pinion are spiroid. Since the table 16 on its lower surface is provided with a hub similar to that of the coupling 12 which is held fixed to the shaft 14 while clamp 15 is loosened, by rotation of the knob 49, the clamp 15, coupling 12, and shaft 10, are rotated relative to shaft 14. This permits angular adjustment or displacement of one shaft with respect to the other.

In order to more fully comprehend and appreciate this invention it remains to summarize the operations and adjustment of the coupling arrangement described above. The physical flexible coupling as illustrated, comprises two sets of flexible beryllium copper discs mounted and supported between a stainless steel (or aluminum) center plate piece and a pair of end plate hubs of a similar metal. The adjustment portion comprises a table having a spiroid gear and a pinion coacting therewith carried by a clamp. It should be noted that split hubs and clamps are employed to secure the shaft with the other components. This type of coupling and locking eliminates any "rocking action" on the shaft and possible decentering of the coupling axis from the axis of rotation.

Referring now specifically to FIG. 1 it is clear that in operation the arrangement necessitates merely the mounting of the flexible coupling and the "zeroing" or reference adjustment which comprises the following:

(1) clamp 37 is securely clamped to lock shaft 10 which in this case is the rotor shaft of synchro 11 and which turns therein on its own bearings.

(2) shaft 14 which is an extension of the reference device 18, carries thereon a lower clamp that secures the indexing table 16 to the shaft, and an adjustable clamp 15 which is pinned to the lower hub of the coupling 12 while remaining loose about the hub and shaft 14.

(3) next the reference device is set to zero and the adjustment knob 49 rotated until the electrical output of the synchro is made a zero signal.

(4) clamp 15 is then secured to lock the hub of the coupling to shaft 14 and so the shafts are referenced.

The most readily apparent advantages herein include high torsional rigidity, no lost motion or hysteresis in the coupling, allows axial compression of the coupling (sometimes necessary with certain indexing tables), simple and accurate zeroing.

It will be understood that various changes in the details, materials and arrangements of parts (and steps), which have been herein described and illustrated in order to explain the nature of the invention, may be made by those skilled in the art within the principles and scope of the invention as expressed in the appended claim.

I claim:

A flexible precision adjustable coupling arrangement for coupling together a pair of shafts which may be misaligned comprising:

(a) a flexible coupling having
 (1) a pair of metallic end plates each having a central passage therethrough and a split hub extending outwardly thereof,
 (2) a metallic inner center plate disposed intermediate of said end plates and having a central passage therethrough aligned with said passages of said end plates,
 (3) flexible metallic discs disposed intermediate said inner and end plates,
 (4) said plates and discs being each provided with four apertures symmetrically disposed about said central passages and extending axially thereof, said apertures of said plates and discs being aligned,
 (5) washers disposed intermediate said discs and plates and aligned with said apertures and in abutting relation with said discs and plates,
 (6) walls defining an opposing pair of said apertures in said inner plate being provided with threads,
 (7) first screw means extending inwardly from said end plates through said apertures and threadingly mating into said opposing pair of apertures in said inner plate,
 (8) said first screw means being free to move lengthwise within said end plates,
 (9) second screw means extending outwardly from said inner plate through the other of said apertures in said discs and end plates and bolted at said end plates,
 (10) said second screw means being free to move lengthwise within said innner plate,
(b) a first clamp affixing one of said split hubs of said coupling to one of said shafts,
(c) means for selectively clamping the other of said shafts to the other of said split hubs,
(d) an indexing turntable disposed about the other of said shafts and affixed thereto and carrying a spiroid gear,
(e) an adjustable turning means pinned for rotation with the other of said split hubs and carrying a rotatable pinion and disposed intermediate said turntable and said other hub with said gear and pinion in operative engagement,
(f) whereby said shafts are coupled together and one of said shafts can be rotatably indexed and referenced with respect to the other of said shafts by said turning means and thereafter clamping said other end of said coupling to said other shaft.

References Cited by the Examiner

UNITED STATES PATENTS

| Re. 15,672 | 8/1923 | Thomas | 64—13 |
|---|---|---|---|
| 1,298,556 | 3/1919 | Persson | 64—13 |
| 2,182,711 | 12/1939 | Thomas | 64—13 |
| 2,499,093 | 2/1950 | Fast | 64—13 |
| 3,024,629 | 3/1962 | Raskhodoff | 64—24 |
| 3,127,784 | 4/1964 | O'Neill | 287—52 X |

FOREIGN PATENTS 322,656 12/1929 Great Britain.

MILTON KAUFMAN, *Primary Examiner.*

HALL C. COE, *Examiner.*